(12) United States Patent
Sue et al.

(10) Patent No.: US 8,634,148 B2
(45) Date of Patent: Jan. 21, 2014

(54) LENS DRIVE DEVICE AND MANUFACTURING METHOD THEREFOR

(75) Inventors: Takeshi Sue, Nagano (JP); Yuji Shingu, Nagano (JP); Syusuke Imai, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/407,194

(22) Filed: Feb. 28, 2012

(65) Prior Publication Data

US 2012/0236422 A1   Sep. 20, 2012

(30) Foreign Application Priority Data

Mar. 16, 2011  (JP) ................. 2011-057323

(51) Int. Cl.
  *G02B 7/02*  (2006.01)
(52) U.S. Cl.
  USPC .......................................... 359/813
(58) Field of Classification Search
  USPC ................................ 359/813–830
  See application file for complete search history.

(56) References Cited

U.S. PATENT DOCUMENTS

2008/0259468 A1* 10/2008 Chung .......................... 359/814
2011/0044679 A1*  2/2011 Yoshida et al. ............... 396/133

FOREIGN PATENT DOCUMENTS

JP   2005-165210 A   6/2005

* cited by examiner

*Primary Examiner* — Scott J Sugarman
*Assistant Examiner* — Mustak Choudhury
(74) *Attorney, Agent, or Firm* — Cantor Colburn LLP (57) ABSTRACT

A lens drive device may include a movable body holding a lens and movable in an optical axis direction of the lens, a fixed body movably holding the movable body, a drive mechanism for driving the movable body, and a board on which an imaging element is mounted and which is fixed on an opposite-to-object side of the fixed body. An opposite-to-object side end face of the fixed body is formed with a plurality of projections which are abutted with a mounting face of the board on which the imaging element is mounted for correcting inclination of an optical axis of the lens with respect to the imaging element.

15 Claims, 9 Drawing Sheets

LENS DRIVE DEVICE AND MANUFACTURING METHOD THEREFOR

CROSS REFERENCE TO RELATED APPLICATION

The present invention claims priority under 35 U.S.C. §119 to Japanese Application No. 2011-057323 filed Mar. 16, 2011, the entire content of which is incorporated herein by reference.

FIELD OF THE INVENTION

At least an embodiment of the present invention may relate to a lens drive device used in a relatively small camera which is mounted on a cellular phone or the like and a manufacturing method for the lens drive device.

BACKGROUND

Conventionally, as a lens drive device for driving a photographing lens of a camera which is mounted on a cellular phone or the like, a lens drive device has been known including a lens holder, which holds a plurality of lenses and moves in an optical axis direction, and a case body which holds the lens holder movably in the optical axis direction (see, for example, Japanese Patent Laid-Open No. 2005-165210). In the lens drive device described in the Patent Literature, a circuit board on which an imaging element is mounted is fixed to an end face on an opposite-to-object side of the case body.

The lens drive device is commonly required to restrain an inclination (initial tilt) of an optical axis of a lens with respect to an imaging element when a lens holder is located at a stationary position for preventing one-sided blurring of a photographed image. Conventionally, in the lens drive device, the initial tilt is commonly restrained through accuracy of components which structure the lens drive device.

In recent years, in a market of a camera which is mounted on a cellular phone or the like, requirement for a high pixel density of a camera has been increased. In order to satisfy the requirement for a high pixel density of a camera, the initial tilt is required to be further restrained for preventing one-sided blurring of a photographed image. However, it is difficult that the initial tilt is restrained only through accuracy of components structuring the lens drive device.

SUMMARY

In view of the problem described above, at least an embodiment of the present invention may advantageously provide a lens drive device which is capable of restraining inclination of the optical axis of a lens (initial tilt) with respect to the imaging element when the movable body holding a lens is stopped. Further, at least an embodiment of the present invention may advantageously provide a manufacturing method for the lens drive device.

According to at least an embodiment of the present invention, there may be provided a lens drive device including a movable body which holds a lens and is movable in an optical axis direction of the lens, a fixed body which movably holds the movable body in the optical axis direction, a drive mechanism for driving the movable body in the optical axis direction, and a board on which an imaging element is mounted and which is fixed on an opposite-to-object side of the fixed body. An opposite-to-object side end face which is an end face on the opposite-to-object side of the fixed body is formed with a plurality of projections which are abutted with a mounting face of the board on which the imaging element is mounted for correcting inclination of an optical axis of the lens with respect to the imaging element.

In the lens drive device in accordance with at least an embodiment of the present invention, a plurality of projections for correcting inclination of the optical axis of a lens with respect to an imaging element is formed on an opposite-to-object side end face of the fixed body. Therefore, inclination of the optical axis of the lens with respect to the imaging element is corrected by crushing some of a plurality of the projections, thereby the inclination of the optical axis of the lens (initial tilt) with respect to the imaging element when the movable body is stopped is further restrained in comparison with a conventional device. As a comparison example, it may be possible that inclination of the optical axis of a lens with respect to the imaging element is corrected by correcting a spring member which connects the movable body with the fixed body. When the spring member is corrected for restraining the initial tilt, moving characteristics or the like of the movable body such as a moving speed and a moving amount of the movable body may be affected. On the other hand, in accordance with at least an embodiment of the present invention, without changing the internal structure of the lens drive device, inclination of the optical axis with respect to the imaging element is corrected by inclining the entire lens drive device except the board and the like with the use of a plurality of the projections. Therefore, even when the inclination of the optical axis with respect to the imaging element is corrected, the moving characteristics of the movable body and the like are not affected.

In at least an embodiment of the present invention, the lens drive device is provided with an adhesion layer which is formed of solidified adhesive between the opposite-to-object side end face and the mounting face, and a height of the projection in the optical axis direction is substantially equal to or not more than a thickness of the adhesion layer in the optical axis direction. According to this structure, even when the projections are formed on the opposite-to-object side end face of the fixed body, a space between the opposite-to-object side end face of the fixed body and the mounting face of the board can be filled with an adhesion layer. Therefore, dust is prevented from entering into the inside of the lens drive device from a space between the opposite-to-object side end face of the fixed body and the mounting face of the board.

In at least an embodiment of the present invention, the opposite-to-object side end face is formed with four pieces of the projection, and an intersecting point of diagonal lines of a quadrangle formed by the four projections and the optical axis of the lens are substantially coincided with each other when viewed in the optical axis direction.

In at least an embodiment of the present invention, the opposite-to-object side end face is formed in a substantially quadrangular frame shape, preferably in a rectangular frame shape including a square when viewed in the optical axis direction, and the projection is formed at each of four corners of the opposite-to-object side end face. In this case, inclination correcting of the optical axis can be performed by crushing some pieces of the projections so that the optical axis of the lens is inclined with each side of the opposite-to-object side end face formed in a substantially quadrangular frame shape as a turning center. Further, inclination correcting of the optical axis can be performed by crushing one piece of the projections so that the optical axis of the lens is inclined with each diagonal line of the opposite-to-object side end face as a turning center. In other words, inclination correcting of the optical axis of the lens can be performed in eight directions. In this case, in a case that a plurality of projections of four projections is to be crushed, when their crushing amounts are set to be substantially equal to each other, manufacture of crushing the plurality of the projections is easily performed. Further, at four corners of the opposite-to-object side end face which is formed in a substantially quadrangular frame shape, a wall thickness in a direction perpendicular to the optical axis direction is easily secured in comparison with four sides of the opposite-to-object side end face. Therefore, the projection is easily formed in comparison with a case that the projection is formed on the four sides.

Further, in at least an embodiment of the present invention, the opposite-to-object side end face is formed in a substantially quadrangular frame shape, preferably in a rectangular frame shape including a square when viewed in the optical axis direction, the opposite-to-object side end face is formed with eight projections, and the projection is formed at each of four corners of the opposite-to-object side end face and at each of a substantially center position of four sides of the opposite-to-object side end face. Also in this case, when a plurality of projections is crushed, inclination correcting of the optical axis of the lens can be performed in eight directions. Further, in a case that a plurality of projections of eight projections is to be crushed, when their crushing amounts are set to be substantially equal to each other, manufacture of crushing the plurality of the projections is easily performed.

In at least an embodiment of the present invention, the lens drive device may be manufactured according to a manufacturing method including an inspection process for inspecting an inclination angle and an inclining direction of the optical axis of the lens with respect to the imaging element, and an inclination correcting process in which, when an inclination angle of the optical axis of the lens having been inspected in the inspection process exceeds a predetermined reference value, the projection is crushed on the basis of an inspection result of an inclining direction of the optical axis of the lens in the inspection process to correct inclination of the optical axis of the lens with respect to the imaging element. In the lens drive device manufactured in the manufacturing method, the initial tilt is further restrained in comparison with a conventional device.

In at least an embodiment of the present invention, in the inspection process, an inspection board is abutted with the projections for inspecting the inclination angle and the inclining direction of the optical axis of the lens. According to this manufacturing method, a board for the device is not required to be handled in the inspection process and thus damage or the like of the board is prevented in a manufacturing process of the lens drive device. Further, in this case, when the opposite-to-object side end face of the fixed body whose inclination has been corrected in the inclination correcting process by using the inspection board is abutted with and fixed to the mounting face of the board on which the imaging element is mounted in a state that the movable body and the drive mechanism have been accommodated in the fixed body, the lens drive device is manufactured.

In at least an embodiment of the present invention, the opposite-to-object side end face is formed in a substantially quadrangular frame shape when viewed in the optical axis direction and is formed with four pieces of the projection, the projection is formed at each of four corners of the opposite-to-object side end face and, in the inclination correcting process, two pieces of the projections adjacent to each other in a circumferential direction of the opposite-to-object side end face are crushed or one piece of the projections is crushed for correcting the inclination of the optical axis of the lens. In this case, inclination correcting of the optical axis is performed by inclining the optical axis of the lens with each side of the opposite-to-object side end face formed in a substantially quadrangular frame shape as a turning center, and inclination correcting of the optical axis is performed by inclining the optical axis of the lens with each diagonal line of the opposite-to-object side end face as a turning center. In other words, inclination correcting of the optical axis of the lens can be performed in eight directions. Further, in this case, a correcting angle (correcting amount) of the inclination of the optical axis of the lens with each diagonal line of the opposite-to-object side end face as a turning center is increased.

In at least an embodiment of the present invention, the opposite-to-object side end face is formed in a substantially quadrangular frame shape when viewed in the optical axis direction and is formed with eight pieces of the projection, the projection is formed at each of four corners of the opposite-to-object side end face and at each of a substantially center position of four sides of the opposite-to-object side end face and, in the inclination correcting process, five projections except three projections adjacent to each other in a circumferential direction of the opposite-to-object side end face and formed on one side of the opposite-to-object side end face are crushed, or five projections except one piece of the projections which is disposed at one of the four corners of the opposite-to-object side end face and two pieces of the projections adjacent to the one piece of the projection in the circumferential direction of the opposite-to-object side end face are crushed, thereby the inclination of the optical axis of the lens is corrected. In this case, inclination correcting of the optical axis of the lens is performed in eight directions. Further, in this case, inclination correcting angles of the optical axis of the lens in the respective eight directions can be set to be substantially equal to each other.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Embodiments of the present invention will be described below with reference to the accompanying drawings.

Figure 1:
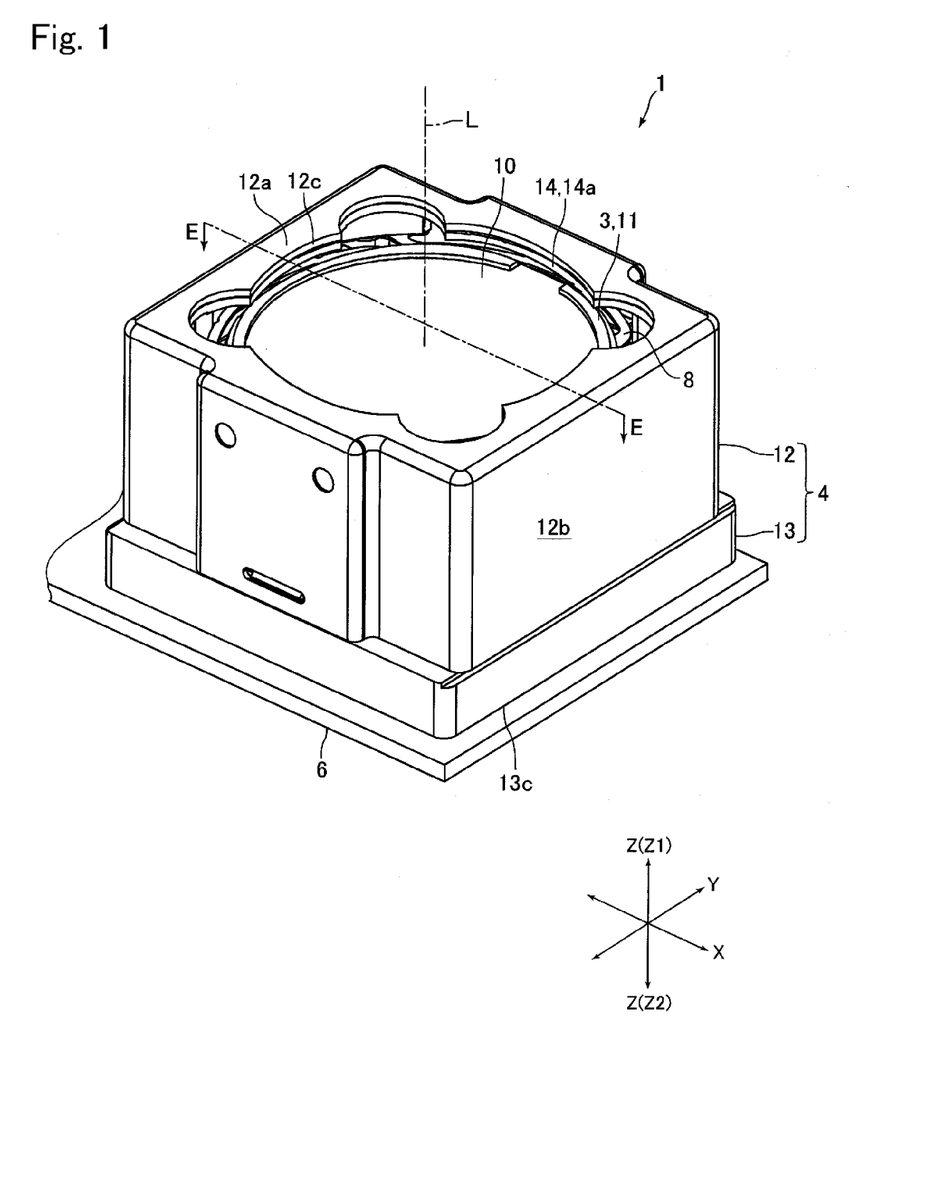
FIG. 1 is a perspective view showing a lens drive device in accordance with an embodiment of the present invention.
Figure 2:
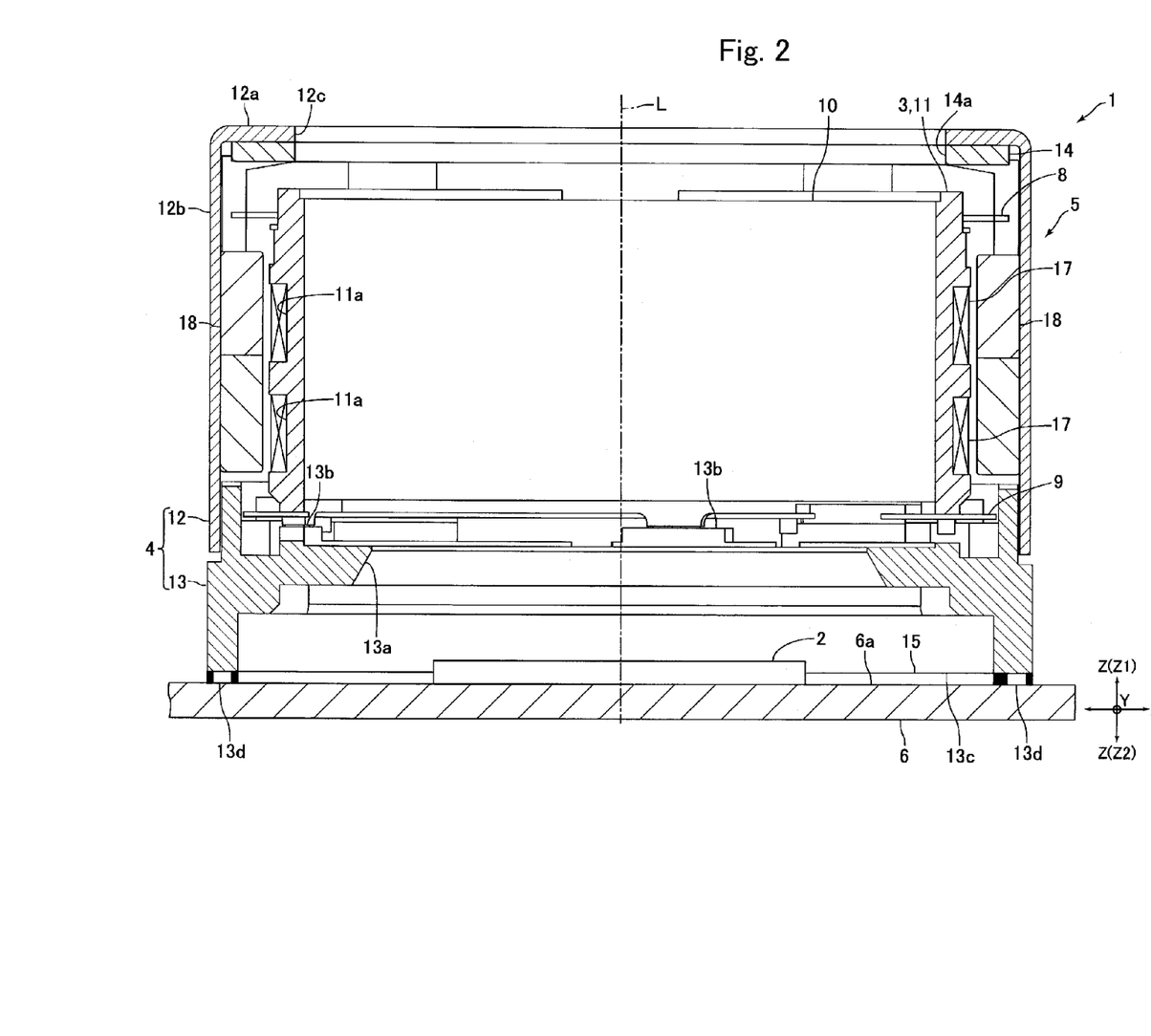
FIG. 2 is a cross-sectional view showing the "E-E" cross section in FIG. 1.
Figure 3:
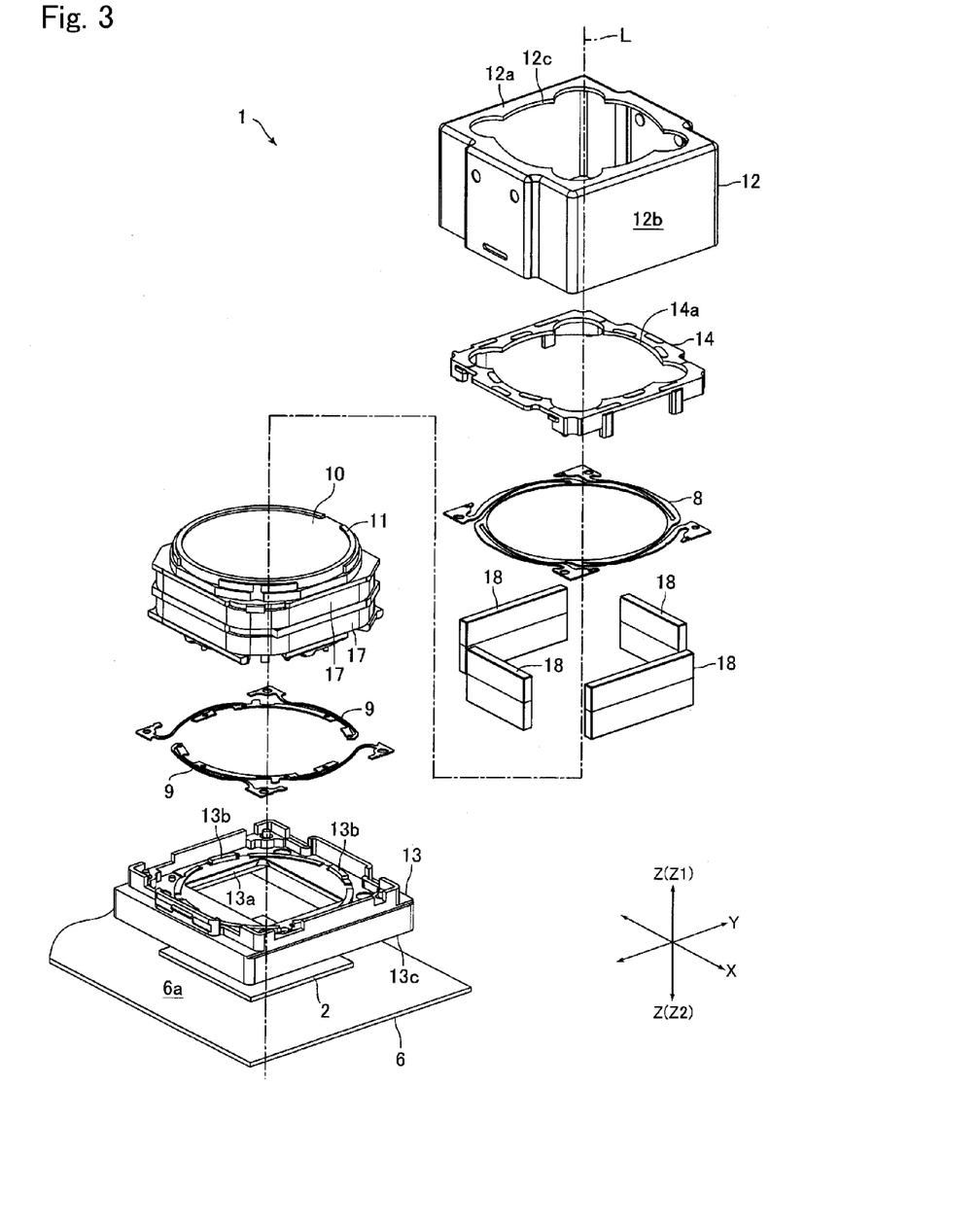
FIG. 3 is an exploded perspective view showing the lens drive device in FIG. 1.
Figure 4:
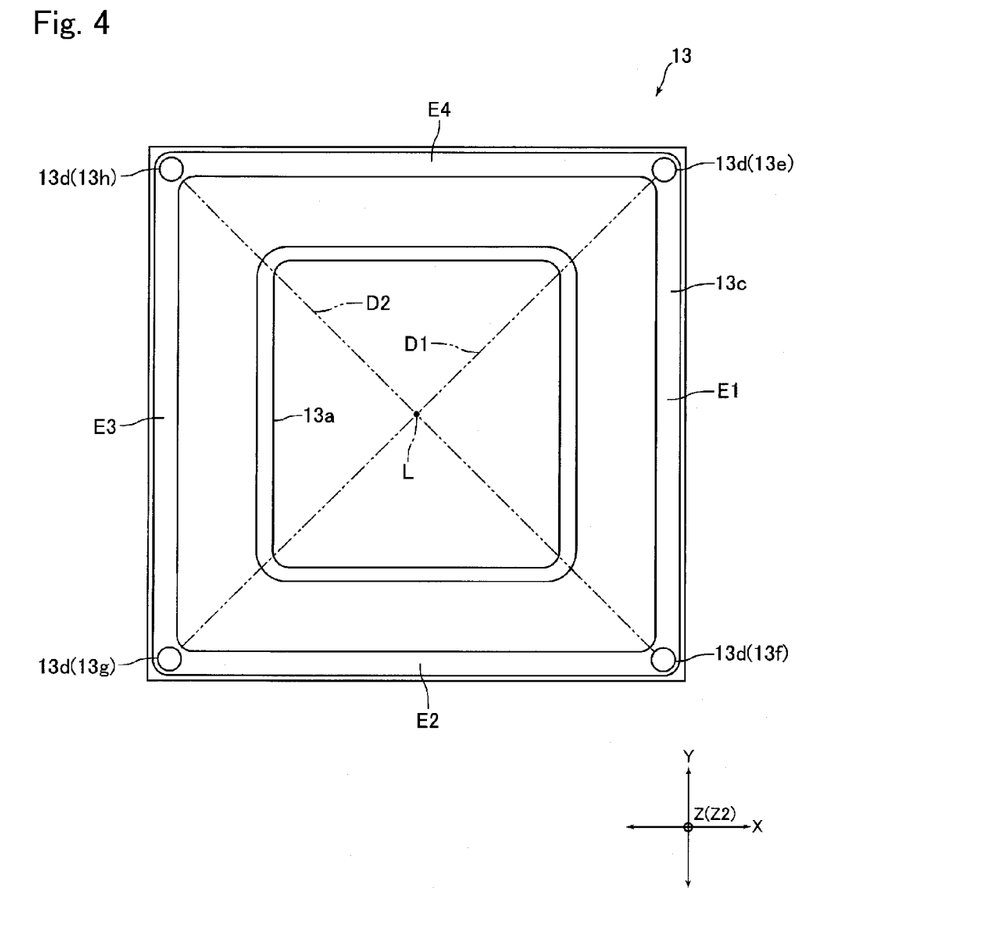
FIG. 4 is a bottom view showing a base member in FIG. 1.

FIG. 1 is a perspective view showing a lens drive device 1 in accordance with an embodiment of the present invention. FIG. 2 is a cross-sectional view showing the "E-E" cross section in FIG. 1. FIG. 3 is an exploded perspective view showing the lens drive device 1 in FIG. 1. FIG. 4 is a bottom view showing a base member 13 in FIG. 1. In the following description, as shown in FIG. 1 and the like, three directions perpendicular to each other are set to be an "X" direction, a "Y" direction and a "Z" direction and the "X" direction is set to be a right and left direction, the "Y" direction is a front and rear direction, and the "Z" direction is an upper and lower direction. Further, a "Z1" direction side in FIG. 1 and the like is set to be an "upper" side and a "Z2" direction side is a "lower" side.

A lens drive device 1 in this embodiment is mounted on a relatively small camera which is used in a cellular phone, a drive recorder, a monitoring camera system or the like and, as shown in FIG. 1, formed in a roughly rectangular prism shape as a whole. Specifically, the lens drive device 1 is formed in a roughly square shape when viewed in a direction of an optical axis "L" (optical axis direction) of a lens for photography. Further, four side faces of the lens drive device 1 are substantially parallel to the right and left direction or the front and rear direction.

In this embodiment, the "Z" direction (upper-and-lower direction) is substantially coincided with the optical axis direction. Further, in the lens drive device 1 in this embodiment, an imaging element is disposed on a lower end side of the device and an object to be photographed on an upper side is photographed. In other words, in this embodiment, the upper side ("Z1" direction side) is an object to be photographed side (object side) and the lower side ("Z2" direction side) is an opposite-to-object side (imaging element side, image side).

The lens drive device 1 is, as shown in FIGS. 1 and 2, provided with a movable body 3 which holds a lens for photography and is movable in the optical axis direction, a fixed body 4 which movably holds the movable body 3 in the optical axis direction, a drive mechanism 5 for driving the movable body 3 in the optical axis direction, and a circuit board 6 on which the imaging element 2 is mounted. Further, the lens drive device 1 is, as shown in FIGS. 2 and 3, provided with plate springs 8 and 9 which connect the movable body 3 with the fixed body 4. In other words, the movable body 3 is movably held by the fixed body 4 through the plate springs 8 and 9.

The movable body 4 is provided with a sleeve 10 which holds a lens holder 10 to which a plurality of lenses are fixed. The fixed body 4 is provided with a cover member 12 which structures a side face of the lens drive device 1, a base member 13 which structures an opposite-to-object side portion of the lens drive device 1, and a spacer 14 to which parts of the plate spring 8 are fixed.

The lens holder 10 is formed in a substantially cylindrical tube shape. A plurality of lenses is fixed to an inner peripheral side of the lens holder 10. The sleeve 11 is, for example, formed of resin material and is formed in a roughly tube-like shape. An outer peripheral face of the lens holder 10 is fixed to an inner peripheral face of the sleeve 11. A winding recessed part 11a around which a drive coil 17 described below is wound is formed at two portions on an outer peripheral side of the sleeve 11 (see FIG. 2). The winding recessed part 11a is formed so as to be recessed from the outer peripheral face of the sleeve 11.

The cover member 12 is formed of magnetic material. Further, the cover member 12 is formed in a roughly bottomed rectangular tube-like shape which is provided with a bottom part 12a and a tube part 12b. A through hole 12c is formed at a center of the bottom part 12a which is disposed on the upper side.

The base member 13 is formed of resin material having an insulation property. Further, the base member 13 is formed in a block shape whose shape when viewed in the optical axis direction is a substantially square shape. The base member 13 is attached to the lower end side of the cover member 12. A through hole 13a is formed at a center of the base member 13. An upper face of the base member 13 is formed with a reference face 13b for determining a reference position of the movable body 3 in the optical axis direction so as to be substantially perpendicular to the optical axis direction. An under face 13c of the base member 13 is formed so that its shape when viewed in the optical axis direction is a substantially square frame shape. The under face 13c in this embodiment is an opposite-to-object side end face which is an end face on the opposite-to-object side of the fixed body 4.

The under face 13c is formed with a plurality of projections 13d for correcting an inclination of the optical axis "L" of the lens with respect to the imaging element 2 so as to protrude to the lower direction. In this embodiment, four projections 13d are formed on the under face 13c. Further, the projection 13d is, as shown in FIG. 4, formed at each of four corners of the under face 13c which is formed in a substantially square frame shape. In this embodiment, the base member 13 is disposed so that the optical axis "L" is passed through the center of the base member 13 and an intersecting point of the diagonal lines D1 and D2 connecting two projections 13d which are disposed at diagonal positions of the under face 13c are substantially coincided with the optical axis "L" when viewed in the optical axis direction.

The projection 13d is formed in a flat and cylindrical shape. An outer diameter of the projection 13d is small and its height (height in the optical axis direction) is thin (small). For example, the outer diameter of the projection 13d is about 0.3 mm and the height of the projection 13d is about 0.03 mm. In the following descriptions, when four projections 13d are required to be separately indicated, each of the four projections 13d are indicated as the projection 13e, the projection 13f, the projection 13g and the projection 13h. The projections 13e through 13h are formed on the frame-shaped under face 13c in this order in the circumferential direction.

The spacer 14 is, for example, formed of resin material and is formed in a roughly square and flat block shape. Further, the spacer 14 is formed in a frame shape and a through hole 14a is formed at its center. The spacer 14 is fixed to an under face of the bottom part 12a of the cover member 12.

The imaging element 2 is mounted on an upper face 6a of the circuit board 6. In other words, the upper face 6a of the circuit board 6 is a mounting face on which the imaging element 2 is mounted. The circuit board 6 is fixed to a lower end of the base member 13. Specifically, the circuit board 6 is fixed to the under face 13c of the base member 13 by an adhesive in a state that an upper face 6a of the circuit board 6 is abutted with the lower ends of the projections 13d. The imaging element 2 is disposed at a position through which the optical axis "L" is passed and is disposed on an inner side of the base member 13.

An adhesion layer 15 which is formed by solidifying an adhesive applied between the upper face 6a of the circuit board 6 and the under face 13c of the base member 13 is formed between the upper face 6a and the under face 13c. A thickness of the adhesion layer 15 in the optical axis direction is substantially equal to the height of the projection 13d and a gap space between the upper face 6a and the under face 13c is filled with the adhesion layer 15. In this embodiment, one or two projections 13d of the four projections 13d may be crushed so that no projection is left on the under face 13c of the base member 13 in the manufacturing process of the lens drive device 1 described below. In this case, a part of the upper face 6a of the circuit board 6 is abutted with the under face 13c of the base member 13.

The plate spring 8 is provided with a ring-shaped movable body fixing part which is fixed to the upper end side of the sleeve 11, fixed body fixing parts which are fixed to the spacer 14 and arm parts which connect the movable body fixing part with the fixed body fixing parts. The plate spring 9 is provided with a movable body fixing part which is fixed to the lower end side of the sleeve 11, fixed body fixing parts which are fixed to the base member 13 and arm parts which connect the movable body fixing part with the fixed body fixing parts.

The drive mechanism 5 is provided with two drive coils 17 which are wound around the outer peripheral side of the sleeve 11 and a drive magnet 18 which is disposed along each of four side faces of the lens drive device 1. Two drive coils 17 are disposed with a predetermined space therebetween in the optical axis direction. The drive magnet 18 is formed in a substantially rectangular plate shape whose shape when viewed in the optical axis direction is a rectangular flat shape. The drive magnet 18 is fixed to the inner side face of the tube part 12b of the cover member 12 so as to face the outer peripheral faces of the drive coils 17.

Figure 5:
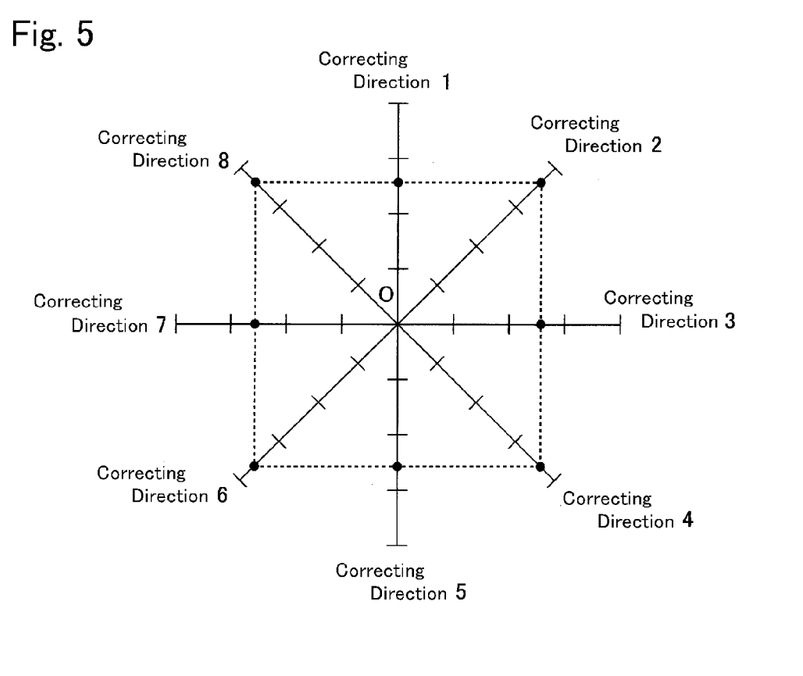
FIG. 5 is a graph for explaining a relationship between a correcting direction of an inclination of an optical axis of a lens and a correcting angle when the inclination of the optical axis of the lens is corrected in an inclination correcting method of a lens in accordance with an embodiment of the present invention.

FIG. 5 is a graph for explaining a relationship between a correcting direction of an inclination of an optical axis of a lens and a correcting angle when the inclination of the optical axis of the lens is corrected in an inclination correcting method of a lens in accordance with an embodiment of the present invention.

In a manufacturing process in which the lens drive device 1 structured as described above is manufactured, an inclination angle (inclination amount) and an inclination direction of the optical axis "L" of the lens with respect to the imaging element 2 are inspected by utilizing the lens drive device 1 before the circuit board 6 is adhesively fixed to the under face 13c and the projections 13d of the base member 13 (inspection process). In other words, an inclination angle and an inclination direction of the optical axis "L" with respect to the axis of the imaging element 2 are inspected. Specifically, a board for inspection (not shown) on which an imaging element for inspection is mounted is abutted with four projections 13d of the base member 13 and an inclination angle and an inclination direction of the optical axis "L" with respect to the imaging element for inspection are inspected instead of inspecting an inclination angle and an inclination direction of the optical axis "L" with respect to the imaging element 2.

When the inclination angle of the optical axis "L" having been inspected in the inspection process exceeds a predetermined reference value, a projection(s) 13d is crushed on the basis of an inspection result of the inclination direction of the optical axis "L" in the inspection process, thereby the inclination of the optical axis "L" with respect to the imaging element 2 is corrected (inclination correction process). In other words, in a case that the inclination angle of the optical axis "L" having been inspected in the inspection process exceeds the predetermined reference value, the projection(s) 13d is crushed so that the inclination angle of the optical axis "L" is set within the reference value to correct the inclination of the optical axis "L". In the inclination correction process in this embodiment, two projections 13d adjacent to each other in the circumferential direction or one projection 13d of the under face 13c is crushed, thereby the inclination of the optical axis "L" is corrected.

For example, on the basis of an inspection result of the inclination direction of the optical axis "L" in the inspection process, in the four sides "E1" through "E4" structuring the under face 13c which is formed in a substantially square frame shape, when an inclination of the optical axis "L" is to be corrected in the right and left direction with the side "E1" connecting the corner parts where the projections 13e and 13f are formed as a turning center, the projections 13g and 13h are crushed. Similarly, on the basis of an inspection result of the inclination direction of the optical axis "L" in the inspection process, when an inclination of the optical axis "L" is to be corrected in the front and rear direction with the side "E2" connecting the corner parts where the projections 13f and 13g are formed as a turning center, the projections 13h and 13e are crushed. When an inclination of the optical axis "L" is to be corrected in the right and left direction with the side "E3" connecting the corner parts where the projections 13g and 13h are formed as a turning center, the projections 13e and 13f are crushed. Further, when an inclination of the optical axis "L" is to be corrected in the front and rear direction with the side "E4" connecting the corner parts where the projections 13h and 13e are formed as a turning center, the projections 13f and 13g are crushed.

Further, for example, on the basis of an inspection result of the inclination direction of the optical axis "L" in the inspection process, when an inclination of the optical axis "L" is to be corrected with the diagonal line "D1" connecting the projections 13e and 13g as a turning center in a direction which is inclined by −45° with respect to the right and left direction, the projection 13f or the projection 13h is crushed. When an inclination of the optical axis "L" is to be corrected with the diagonal line "D2" connecting the projections 13f and 13h as a turning center in a direction which is inclined by 45° with respect to the right and left direction, the projection 13e or the projection 13g is crushed.

In the inclination correction process in this embodiment, a crushing amount of the projection 13d is set to be the same for all the projections 13d. In this embodiment, the meaning of that "a crushing amount of the projection 13d is set to be the same for all the projections 13d" is that the projections 13d are tried to be crushed so as to obtain the same crushing amount. In this case, the crushed result is not necessarily required to be the same. Inclination correcting angles of the optical axis "L" with respect to the respective inclination correcting directions are shown in FIG. 5. In FIG. 5, the correcting direction 1 is a correcting direction in which the side "E4" is lowered, the correcting direction 2 is a correcting direction in which the corner part where the projection 13e is formed is lowered, the correcting direction 3 is a correcting direction in which the side "E1" is lowered, the correcting direction 4 is a correcting direction in which the corner part where the projection 13f is formed is lowered, the correcting direction 5 is a correcting direction in which the side "E2" is lowered, the correcting direction 6 is a correcting direction in which the corner part where the projection 13g is formed is lowered, the correcting direction 7 is a correcting direction in which the side "E3" is lowered, and the correcting direction 8 is a correcting direction in which the corner part where the projection 13h is formed is lowered. Further, in FIG. 5, the inclination correcting angle becomes larger as separated from the origin "O".

As shown in FIG. 5, the inclination correcting angles in the correcting directions 1, 3, 5 and 7 are equal to each other and the inclination correcting angles in the correcting directions 2, 4, 6 and 8 are equal to each other. Further, a distance between the side "E1" and the side "E3" in the right and left direction and a distance between the side "E2" and the side "E4" in the front and rear direction are shorter than a distance between the diagonal line "D1" whose direction is inclined by −45° with respect to the right and left direction and the projection 13f or the projection 13h and a distance between the diagonal line "D2" whose direction is inclined by 45° with respect to the right and left direction and the projection 13e or the projection 13g. Therefore, the inclination correcting angles in the correcting directions 2, 4, 6 and 8 become larger than the inclination correcting angles in the correcting directions 1, 3, 5 and 7. For example, in a case that the crushing amounts of all the projections 13d are the same as each other, an inclination angle when only the projection 13h is crushed and the optical axis "L" is inclined with the diagonal line "D1" (projections 13e and 13g) as a turning center becomes larger than an inclination angle when two projections 13g and 13h are crushed and the optical axis "L" is inclined in the right and left direction with the side "E1" (projections 13e and 13f) as a turning center. Therefore, the above-mentioned predetermined reference value for determining whether inclination correcting is performed or not is set in consideration of the inclination angle when the projection(s) 13d is crushed.

In accordance with an embodiment, in the inclination correction process, the projection 13d may be crushed by applying pressure and heat to the projection 13d. Alternatively, the projection 13d may be crushed by applying pressure to the projection 13d without applying heat.

As described above, in the lens drive device 1 in this embodiment, four projections 13d for correcting an inclination of the optical axis "L" of the lens with respect to the imaging element 2 are formed on the under face 13c of the base member 13. Further, in this embodiment, in the inspection process, an inclination angle and an inclining direction of the optical axis "L" with respect to the imaging element 2 are inspected and, when the inclination angle of the optical axis "L" having been inspected in the inspection process exceeds a predetermined reference value, in the inclination correction process, the projection(s) 13d is crushed on the basis of an inspection result of the inclining direction of the optical axis "L" in the inspection process, thereby the inclination of the optical axis "L" with respect to the imaging element 2 is corrected. Therefore, in this embodiment, the inclination of the optical axis "L" is corrected by utilizing four projections 13d and thus the initial tilt is further restrained in comparison with a conventional device.

On the other hand, it is conceivable that an inclination of the optical axis "L" is corrected by deforming the plate springs 8 and 9 to further restrain the initial tilt in comparison with a conventional device. However, when the plate springs 8 and 9 are deformed, moving characteristics of the movable body 3 such as a moving speed and a moving amount of the movable body 3 may be affected. On the other hand, in this embodiment, instead of changing the internal structure of the lens drive device 1, the inclination of the optical axis "L" is corrected with the use of four projections 13d by inclining the entire lens drive device 1 except the imaging element 2, the circuit board 6 and the like. Therefore, even when the inclination of the optical axis "L" is corrected, other characteristics of the lens drive device 1 such as the moving characteristics of the movable body 3 are not affected.

In this embodiment, a thickness of the adhesion layer 15 in the optical axis direction is substantially equal to the height of the projection 13d and a gap space between the upper face 6a of the circuit board 6 and the under face 13c of the base member 13 is filled with the adhesion layer 15. Therefore, in this embodiment, even when the projections 13d are formed on the under face 13c of the base member 13, dust is prevented from entering into the inside of the lens drive device 1 from a gap space between the upper face 6a and the under face 13c.

In this embodiment, the projections 13d having the same height are formed at the respective four corners of the under face 13c which is formed in a substantially square frame shape. Therefore, in this embodiment, as described above, the inclination correction of the optical axis "L" can be performed in eight directions, i.e., the correcting directions 1 through 8. Further, four corners of the under face 13c which is formed in a substantially square frame shape are easy to secure wall thickness in the direction perpendicular to the optical axis direction in comparison with the four sides "E1" through "E4" of the under face 13c. Therefore, the projection 13d is easy to be formed in comparison with a case that the projection 13d is formed on the sides "E1" through "E4".

In this embodiment, in the inspection process, a board for inspection is abutted with four projections 13d and an inclination angle and an inclining direction of the optical axis "L" are inspected. Therefore, a circuit board 6 for the device is not required to be handled in the inspection process. Therefore, in this embodiment, damage or the like of the circuit board 6 is prevented in a manufacturing process of the lens drive device 1.

Although the present invention has been shown and described with reference to a specific embodiment, various changes and modifications will be apparent to those skilled in the art from the teachings herein.

Figure 6:
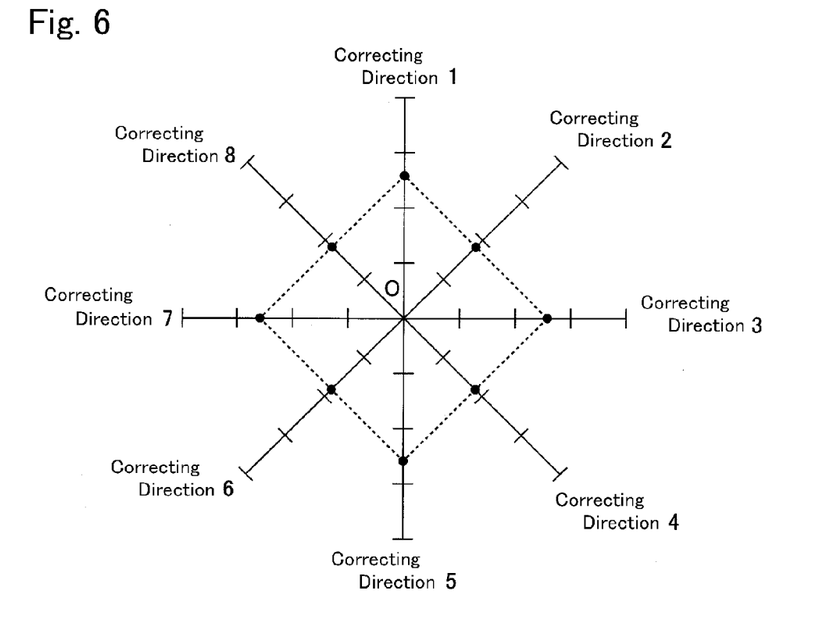
FIG. 6 is a graph for explaining a relationship between a correcting direction of an inclination of an optical axis of a lens and a correcting angle when the inclination of the optical axis of the lens is corrected in an inclination correcting method of a lens in accordance with another embodiment of the present invention.

In the embodiment described above, in the inclination correction process, two projections 13d on the under face 13c which are adjacent to each other in the circumferential direction, or one projection 13d is crushed, thereby the inclination of the optical axis "L" is corrected. However, the present invention is not limited to this embodiment. For example, in the inclination correction process, instead of crushing one projection 13d, three projections 13d may be crushed to correct the inclination of the optical axis "L". In other words, it may be corrected so that, when an inclination of the optical axis "L" is to be corrected in the correcting direction 2, the projections 13e, 13f and 13h are crushed, when an inclination of the optical axis "L" is to be corrected in the correcting direction 4, the projections 13e, 13f and 13g are crushed, when an inclination of the optical axis "L" is to be corrected in the correcting direction 6, the projections 13f, 13g and 13h are crushed, and when an inclination of the optical axis "L" is to be corrected in the correcting direction 8, the projections 13e, 13g and 13h are crushed. The correcting angles with respect to the respective inclination correcting directions in this case are shown in FIG. 6 and the inclination correcting angles in the correcting directions 2, 4, 6 and 8 when three projections 13d are crushed become smaller in comparison with a case that one projection 13d is crushed. In other words, in a case that the inclinations of the optical axis "L" are to be corrected in the correcting directions 2, 4, 6 and 8, when one projection 13d is crushed, the inclination correcting angle is increased. On the contrary, in a case that the inclinations of the optical axis "L" are to be corrected in the correcting directions 2, 4, 6 and 8 by a smaller amount, three projections 13d are crushed.

Figure 7:
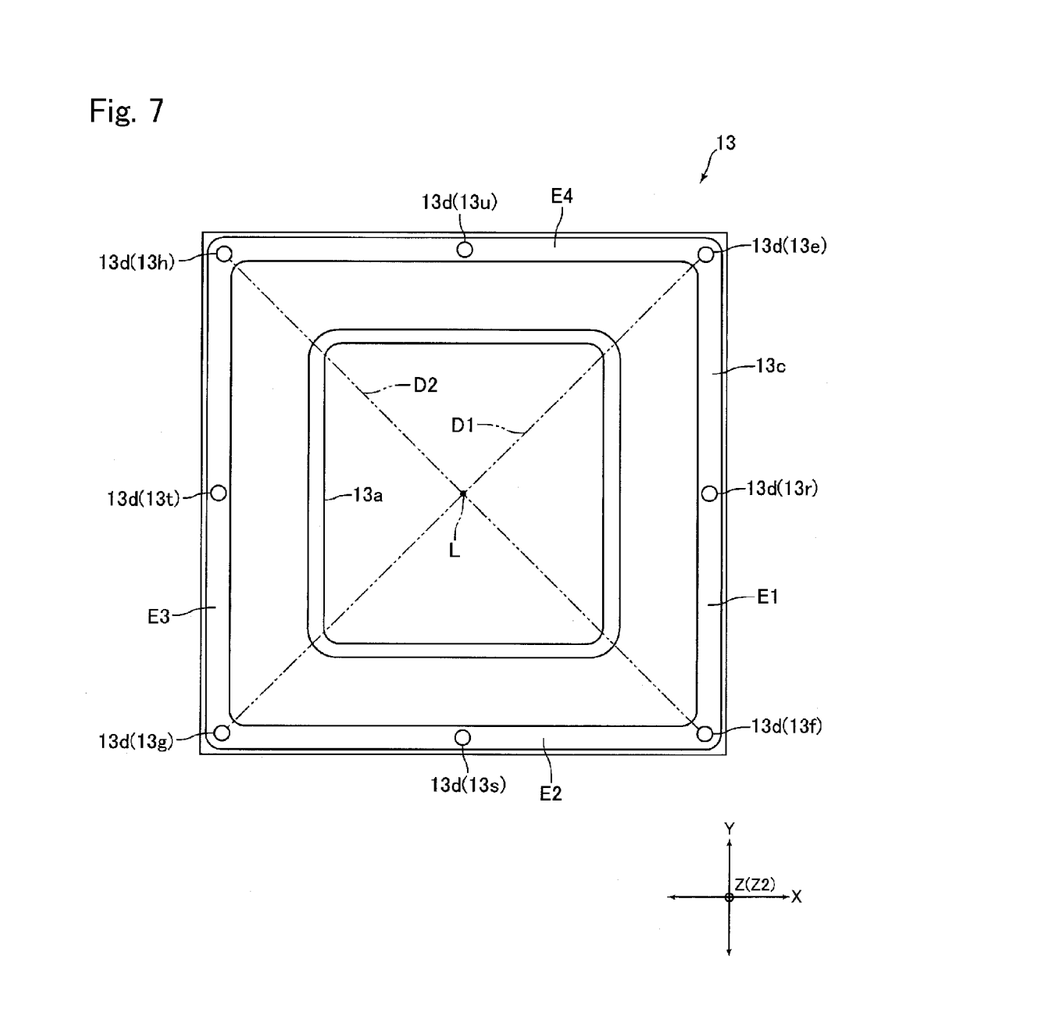
FIG. 7 is a bottom view showing a base member in accordance with another embodiment of the present invention.

In the embodiment described above, the projection 13d is formed at each of the four corners of the under face 13c which is formed in a substantially square frame shape. However, the present invention is not limited to this embodiment. For example, as shown in FIG. 7, in addition to the projections 13d formed at the four corners of the under face 13c, the projection 13d may be formed at each of substantially center positions of the four sides "E1" through "E4" structuring the under face 13c. In other words, eight projections 13d having the same height may be formed on the under face 13c. In the following descriptions, when four projections 13d formed at the substantially center positions of the four sides "E1" through "E4" are required to be separately indicated, each of the four projections 13d are indicated as the projection 13r, the projection 13s, the projection 13t and the projection 13u. The projection 13r is formed on the side "E1", the projection 13s is formed on the side "E2", the projection 13t is formed on the side "E3", and the projection 13u is formed on the side "E4".

In this case, for example, in the inclination correction process, in order to correct an inclination of the optical axis "L", five projections 13d which are adjacent to each other in the circumferential direction on the under face 13c except three projections 13d formed on one side of the sides "E1" through "E4" are crushed. Alternatively, in order to correct an inclination of the optical axis "L", five projections 13d except one projection 13d which is disposed at one of the four corners of the under face 13c and two projections 13d disposed adjacent to the one projection 13d in the circumferential direction on the under face 13c are crushed.

In other words, when an inclination of the optical axis "L" is to be corrected in the correcting direction 1, five projections 13d are crushed except the projections 13f, 13g and 13s, when an inclination of the optical axis "L" is to be corrected in the correcting direction 2, five projections 13d are crushed except the projections 13g, 13s and 13t., when an inclination of the optical axis "L" is to be corrected in the correcting direction 3, five projections 13d are crushed except the projections 13g, 13h and 13t and, when an inclination of the optical axis "L" is to be corrected in the correcting direction 4, five projections 13d are crushed except the projections 13h, 13t and 13u. Further, when an inclination of the optical axis "L" is to be corrected in the correcting direction 5, five projections 13d except the projections 13e, 13h and 13u are crushed, when an inclination of the optical axis "L" is to be corrected in the correcting direction 6, five projections 13d except the projections 13e, 13r and 13u are crushed, when an inclination of the optical axis "L" is to be corrected in the correcting direction 7, five projections 13d except the projections 13e, 13f and 13r are crushed and, when an inclination of the optical axis "L" is to be corrected in the correcting direction 8, five projections 13d except the projections 13f, 13r and 13s are crushed.

Figure 8:
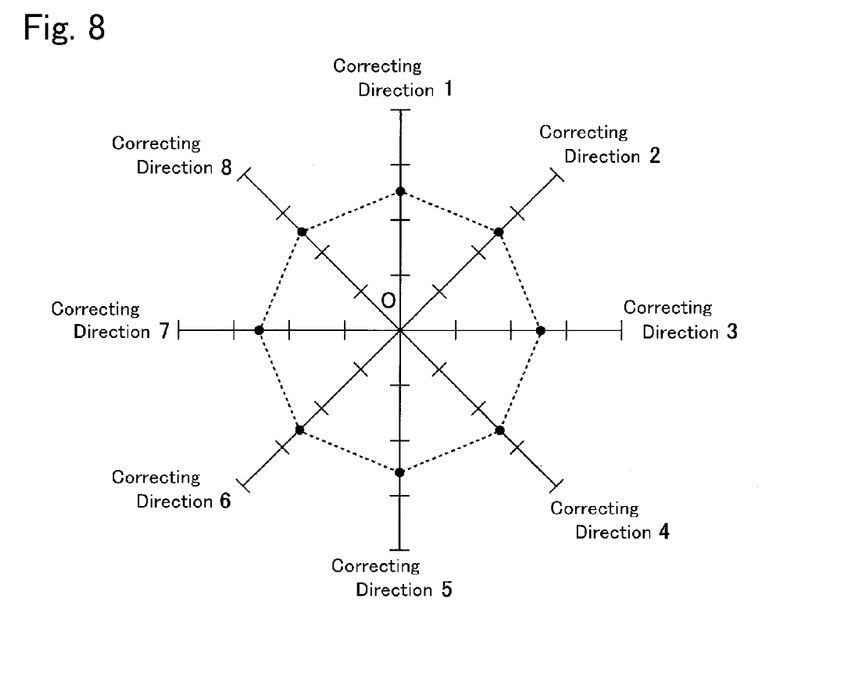
FIG. 8 is a graph for explaining a relationship between a correcting direction of an inclination of an optical axis of a lens and a correcting angle when the inclination of the optical axis of the lens is corrected in a lens drive device in accordance with another embodiment of the present invention.

Also in this case, an inclination correction of the optical axis "L" can be performed in eight directions, i.e., in the correcting directions 1 through 8. Further, in this case, inclination correcting angles of the optical axis "L" with respect to the respective inclination correcting directions are shown in FIG. 8. In other words, in this case, the heights of all the projections 13d are the same as each other and the crushing amounts of all the projections 13d are set to be the same as each other and thus the inclination correcting angles in the respective directions of the correcting directions 1 through 8 are substantially equal to each other.

Further, in the embodiment described above, the projection 13d is formed at each of the four corners of the under face 13c which is formed in a substantially square frame shape. However, when four projections 13d are formed on the under face 13c, the projection 13d may be formed at arbitrary portions of the under face 13c. Similarly, in the modified embodiment shown in FIG. 7, the projection 13d is formed at each of the four corners of the under face 13c and at each of the substantially center positions of the four sides "E1" through "E4" structuring the under face 13c. However, when eight projections 13d are formed on the under face 13c, the projection 13d may be formed at arbitrary positions of the under face 13c.

Figure 9:
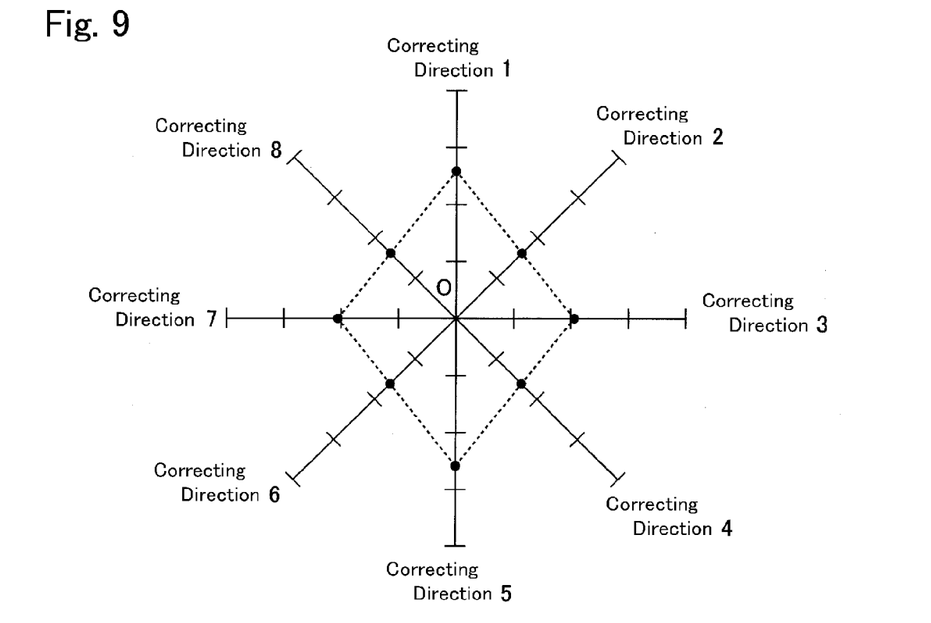
FIG. 9 is a graph for explaining a relationship between a correcting direction of an inclination of an optical axis of a lens and a correcting angle when the inclination of the optical axis of the lens is corrected in a lens drive device in accordance with another embodiment of the present invention.

In the embodiment described above, the under face 13c of the base member 13 is formed so that its shape when viewed in the optical axis direction is formed in a substantially square frame shape. However, the present invention is not limited to this embodiment. For example, the under face 13c may be formed so that its shape when viewed in the optical axis direction is a substantially rectangular frame shape. As an example, in a case that an under face 13c is formed so that its shape when viewed in the optical axis direction is a substantially rectangular frame shape whose long side direction is the right and left direction and a projection 13d is formed at each of the four corners of the under face 13c and, in a case that, in order to correct an inclination of the optical axis "L", two projections 13d or three projections 13d on under face 13c which are adjacent to each other in the circumferential direction are crushed in the inclination correction process, inclination correcting angles of the optical axis "L" in the eight directions, i.e., the correcting directions 1 through 8 are, for example, shown in FIG. 9.

Further, the under face 13c of the base member 13 may be formed so that its shape when viewed in the optical axis direction is a polygonal frame shape except a quadrangular shape or a shape when viewed in the optical axis direction is a substantially circular frame shape or a substantially elliptical frame shape. Further, in the embodiment described above, the lens drive device 1 is formed so that its shape when viewed in the optical axis direction is a roughly quadrangular shaped. However, the lens drive device 1 may be formed so that its shape when viewed in the optical axis direction is a roughly polygonal shape except a quadrangular shape or a shape when viewed in the optical axis direction is a roughly circular shape or a roughly elliptical shape.

In the embodiment described above, four projections 13d are formed on the under face 13c of the base member 13 and, in the modified embodiment shown in FIG. 7, eight projections 13d are formed on the under face 13c. However, the present invention is not limited to this embodiment. For example, two, three, or five through seven pieces of the projections 13d may be formed on the under face 13c. Further, nine or more projections 13d may be formed on the under face 13c. Further, in the embodiment described above, the projection 13d is formed in a flat and cylindrical shape. However, the projection 13d may be formed in a flat and polygonal pillar shape or may be formed in a flat and elliptic cylindrical shape. Further, the projection 13d may be formed in a spherical shape.

In the embodiment described above, the height of the projection 13d in the optical axis direction is substantially equal to the thickness of the adhesion layer 15 in the optical axis direction. However, the present invention is not limited to this embodiment. For example, the height of the projection 13d in the optical axis direction may be not more than the thickness of the adhesion layer 15 in the optical axis direction. Further, in the embodiment described above, the crushing amounts of all the projections 13d in the inclination correction process are set to be the same as each other. However, a crushing amount of the projection 13d in the inclination correction process may be varied depending on an inspection result of an inclination angle of the optical axis "L" in the inspection process.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A lens drive device comprising:
   a movable body which holds a lens and is movable in an optical axis direction of the lens;
   a fixed body which movably holds the movable body in the optical axis direction;
   a drive mechanism for driving the movable body in the optical axis direction; and
   a board on which an imaging element is mounted and which is fixed on an opposite-to-object side of the fixed body;
   wherein an opposite-to-object side end face which is an end face on the opposite-to-object side of the fixed body is formed with a plurality of projections which are abutted with a mounting face of the board on which the imaging element is mounted for correcting inclination of an optical axis of the lens with respect to the imaging element; and
   wherein the opposite-to-object side end face is formed in a substantially rectangular frame shape when viewed in the optical axis direction,
   the opposite-to-object side end face is formed with eight projections, and
   the projection is formed at each of four corners of the opposite-to-object side end face and at each of a substantially center position of four sides of the opposite-to-object side end face.

2. The lens drive device according to claim 1, further comprising an adhesion layer which is formed of solidified adhesive between the opposite-to-object side end face and the mounting face,
   wherein a height of the projection in the optical axis direction is substantially equal to or not more than a thickness of the adhesion layer in the optical axis direction.

3. The lens drive device according to claim 1, wherein
   the opposite-to-object side end face is formed with four pieces of the projection, and
   an intersecting point of diagonal lines of a quadrangle formed by the four projections and the optical axis of the lens are substantially coincided with each other when viewed in the optical axis direction.

4. The lens drive device according to claim 3, wherein
   the opposite-to-object side end face is formed in a substantially rectangular frame shape when viewed in the optical axis direction, and
   the projection is formed at each of four corners of the opposite-to-object side end face.

5. The lens drive device according to claim 3, further comprising an adhesion layer which is formed of solidified adhesive between the opposite-to-object side end face and the mounting face,
   wherein a height of the projection in the optical axis direction is substantially equal to or not more than a thickness of the adhesion layer in the optical axis direction.

6. The lens drive device according to claim 3, wherein, when a plurality of the projections of the four projections is to be crushed, crushing amounts of the plurality of the projections to be crushed are substantially same as each other.

7. The lens drive device according to claim 1, wherein
   the opposite-to-object side end face is formed in a substantially rectangular frame shape when viewed in the optical axis direction, and
   an intersecting point of diagonal lines of a quadrangle formed by the four projections located at four corners of the opposite-to-object side end face and the optical axis of the lens are substantially coincided with each other when viewed in the optical axis direction.

8. The lens drive device according to claim 1, further comprising an adhesion layer which is formed of solidified adhesive between the opposite-to-object side end face and the mounting face,
   wherein a height of the projection in the optical axis direction is substantially equal to or not more than a thickness of the adhesion layer in the optical axis direction.

9. The lens drive device according to claim 1, wherein, when a plurality of the projections of the eight projections is to be crushed, crushing amounts of the plurality of the projections to be crushed are substantially same as each other.

10. A manufacturing method for a lens drive device including a movable body which holds a lens and is movable in an optical axis direction of the lens, a fixed body which movably holds the movable body in the optical axis direction, a drive mechanism for driving the movable body in the optical axis direction, a board on which an imaging element is mounted and which is fixed on an opposite-to-object side of the fixed body, and a plurality of projections which are formed on an opposite-to-object side end face that is an end face on the opposite-to-object side of the fixed body and are abutted with a mounting face of the board on which the imaging element is mounted for correcting inclination of an optical axis of the lens with respect to the imaging element,
    the manufacturing method comprising:
    inspecting an inclination angle and an inclining direction of the optical axis of the lens with respect to the imaging element; and
    an inclination correcting process in which, when the inclination angle of the optical axis of the lens exceeds a predetermined reference value, the projection is crushed on a basis of an inspection result of the inclining direction of the optical axis of the lens to correct inclination of the optical axis of the lens with respect to the imaging element;
    wherein the opposite-to-object side end face is formed in a substantially quadrangular frame shape when viewed in the optical axis direction and is formed with eight pieces of the projection,
    the projection is formed at each of four corners of the opposite-to-object side end face and at each of a substantially center position of four sides of the opposite-to-object side end face, and
    five projections except three projections adjacent to each other in a circumferential direction of the opposite-to-object side end face and formed on one side of the opposite-to-object side end face are crushed or, five projections except one piece of the projections which is disposed at one of the four corners of the opposite-to-object side end face and two pieces of the projections adjacent to the one piece of the projection in the circumferential direction of the opposite-to-object side end face are crushed, thereby the inclination of the optical axis of the lens is corrected.

11. The manufacturing method for a lens drive device according to claim 10, wherein the opposite-to-object side end face is formed in a substantially quadrangular frame shape when viewed in the optical axis direction and is formed with four pieces of the projection, the projection is formed at each of four corners of the opposite-to-object side end face, and two pieces of the projections adjacent to each other in a circumferential direction of the opposite-to-object side end face are crushed or one piece of the projections is crushed for correcting the inclination of the optical axis of the lens.

12. The manufacturing method for a lens drive device according to claim 10, wherein, an inspection board is abutted with the projections for inspecting the inclination angle and the inclining direction of the optical axis of the lens.

13. The manufacturing method for a lens drive device according to claim 12, wherein, when a plurality of the projections is to be crushed, the plurality of the projections is crushed so that crushing amounts of the plurality of the projections are substantially same as each other.

14. The manufacturing method for a lens drive device according to claim 12, wherein, the opposite-to-object side end face of the fixed body whose inclination has been corrected by using the inspection board is abutted with and fixed to the mounting face of the board on which the imaging element is mounted in a state that the movable body and the drive mechanism have been accommodated in the fixed body.

15. The manufacturing method for a lens drive device according to claim 14, wherein an adhesive for adhesively fixing the opposite-to-object side end face to the mounting face is provided between the opposite-to-object side end face and the mounting face of the board on which the imaging element is mounted, and a gap space between the opposite-to-object side end face and the mounting face for the imaging element is closed with the adhesive.

* * * * *